(12) United States Patent
Kolassa et al.

(10) Patent No.: US 6,290,019 B1
(45) Date of Patent: Sep. 18, 2001

(54) SYSTEM AND METHOD FOR VEHICLE SIDE ROLLOVER AVERSION

(75) Inventors: Scott Edward Kolassa, Canton; Kevin J. Schemansky, Howell, both of MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/551,692

(22) Filed: Apr. 18, 2000

(51) Int. Cl.[7] ................................................. B60R 21/13
(52) U.S. Cl. ........................... 180/282; 280/755; 701/45
(58) Field of Search ........................... 180/282; 280/755; 701/45; 340/440; B60R 21/13

(56) References Cited

U.S. PATENT DOCUMENTS

| 5,610,575 | 3/1997 | Gioutsos . |
|---|---|---|
| 5,825,284 | 10/1998 | Dunwoody et al. . |
| 5,890,084 | 3/1999 | Halasz et al. . |
| 5,931,499 | 8/1999 | Sutherland . |
| 6,002,974 | 12/1999 | Schiffmann . |
| 6,002,975 | 12/1999 | Schiffmann et al. . |
| 6,170,594 | * 1/2001 | Gilbert .................................. 180/282 |

* cited by examiner

Primary Examiner—Peter C. English
(74) Attorney, Agent, or Firm—Tarolli, Sundheim, Covell, Tummino & Szabo L.L.

(57) ABSTRACT

A system (10) and an associated method to avert vehicle side rollover for a vehicle (12) that has inflated tires (14A–14D). A sensor (18) senses a parameter indicative of an imminent threat of vehicle rollover to one side of the vehicle (12). A tire deflator device (e.g., 26A) reduces an inflation pressure of one of the vehicle tires (14A) on one side of the vehicle (12) to avert vehicle rollover in response to the imminent threat of vehicle rollover.

7 Claims, 3 Drawing Sheets

SYSTEM AND METHOD FOR VEHICLE SIDE ROLLOVER AVERSION

FIELD OF THE INVENTION

The present invention relates to systems that prevent side rollover of a vehicle.

BACKGROUND OF THE INVENTION

Side rollover of vehicles is a serious safety concern. A vehicle rollover event is defined as an event in which the tread of all of the wheels of a vehicle breaks contact with the ground, and the side or the roof of the vehicle contacts the ground.

It is possible that incidents of rollover accidents may be increasing for vehicles such as passenger vehicles, apparently due to changing demographics of vehicles in current use. For example, vehicles that have a higher center of gravity, such as sport utility vehicles, have become increasingly popular in recent years. Thus, there has been an associated increase in the efforts to reduce the propensity of vehicles to rollover and also in the efforts to protect vehicle occupants in the event of a vehicle rollover. An example of an effort to reduce propensity of vehicle roll includes provision of active devices that control steering and suspension. An example of an effort to protect a vehicle occupant during a vehicle rollover event is the provision of pyrotechnic side curtain devices that are actuated upon the event of a vehicle rollover.

SUMMARY OF THE INVENTION

In accordance with one aspect, the present invention provides a system for averting vehicle side rollover for a vehicle having inflated tires. Means senses a parameter indicative of an imminent threat of vehicle rollover to one side of the vehicle. Means reduces an inflation pressure of one of the vehicle tires on one side of the vehicle to avert vehicle rollover in response to the imminent threat of vehicle rollover.

In accordance with another aspect, the present invention provides a system for averting vehicle side rollover for a vehicle that has inflated tires. Means senses a parameter indicative of vehicle roll and outputs a signal indicative thereof. Means determines if the parameter signal is indicative of an imminent threat of vehicle rollover to one side of the vehicle. Means reduces an inflation pressure of one of the vehicle tires on the side of the vehicle to avert vehicle rollover in response to an affirmative determination of imminent threat of vehicle rollover.

In accordance with another aspect, the present invention provides a method for averting vehicle side rollover for a vehicle having inflated tires. A parameter indicative an imminent threat of vehicle rollover to one side of the vehicle is sensed. An inflation pressure of one of the vehicle tires on one side of the vehicle is reduced to avert vehicle rollover in response to the imminent threat of vehicle rollover.

BRIEF DESCRIPTION OF THE DRAWINGS

The foregoing and other features and advantages of the present invention will become apparent to those skilled in the art to which the present invention relates upon reading the following description with reference to the accompanying drawings, wherein.

DESCRIPTION OF PREFERRED EMBODIMENT

Figure 1:
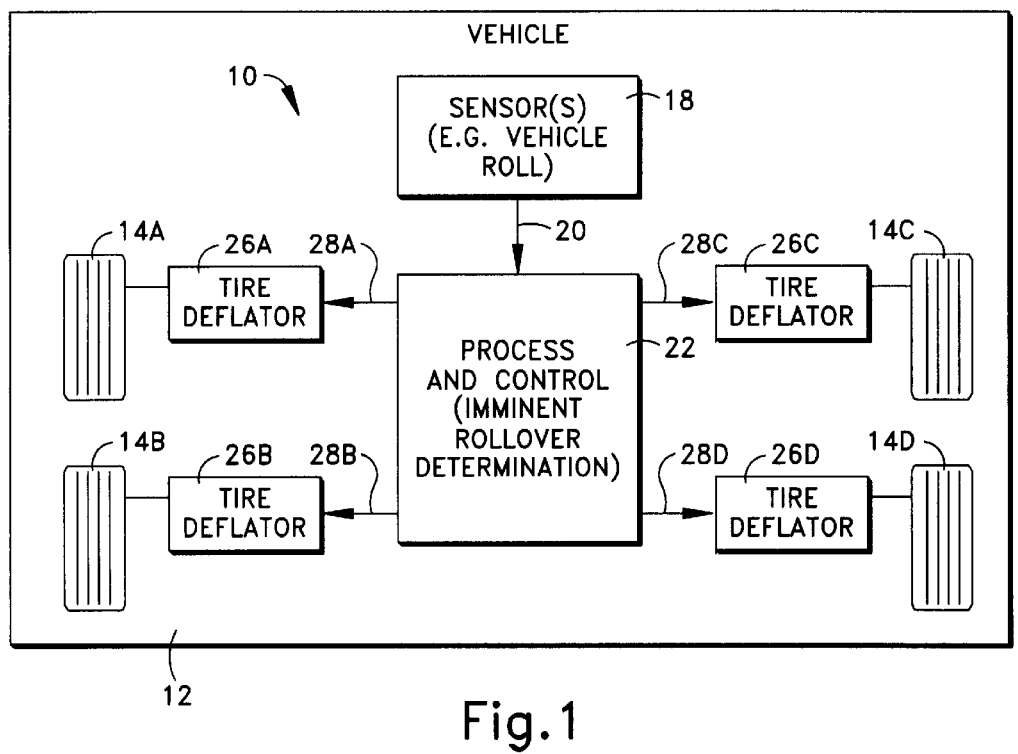
FIG. 1 is a schematic illustration of a system in accordance with the present invention, and an associated vehicle.

A system 10, in accordance with the present invention, and an associated vehicle 12 are schematically shown in FIG. 1. The vehicle 12 includes a plurality (4) of inflated tires 14A–14D for engaging a ground surface 16 (shown in FIG. 2). The vehicle 12 may be any type of vehicle. For example, the vehicle 12 may be a passenger car, a sport utility vehicle, a van, a truck, or a tractor-trailer combination.

The system 10 (FIG. 1) includes at least one sensor 18 that senses a vehicle parameter and outputs a signal 20 indicative of the parameter. The parameter is indicative of or is related to, or processing the parameter signal provides a result that is indicative of or is related to, vehicle side roll. It is to be appreciated that the sensor(s) 18 may include a tilt sensor, a lateral acceleration sensor, and/or a height sensor.

The sensor(s) 18 is operatively connected to provide its signal(s) 20 to a process and control portion 22 that performs an imminent rollover determination function. Specifically, the process and control portion 22 processes the parameter signal(s) 20 to determine if an imminent threat of vehicle rollover is occurring. Further, it is to be appreciated that the process and control portion 22 makes a determination regarding whether the imminent threat of rollover is in a direction toward the left side (e.g., driver side) or the right side (e.g., passenger side) of the vehicle 12. A microcomputer or a microprocessor performing one or more algorithms and/or discrete components may provide the process and control portion 22. It is to be appreciated that depending upon the vehicle parameter(s) that is sensed by the sensor(s) 18, processing of the parameter signal(s) 20 to determine the occurrence of imminent threat of rollover may be unnecessary if the parameter signal(s) per se indicates the imminent threat of rollover.

A plurality of tire deflator devices 26A–26D is provided within the system 10. Each tire deflator device (e.g., 26A) is associated with a respective one of the tires (e.g., 14A) of the vehicle 12. Also, each tire deflator device (e.g., 26A) is operatively connected to the process and control portion 22. In response to a control signal (e.g., 28A) from the process and control portion 22, each tire deflator device (e.g., 26A) rapidly reduces an inflation pressure within the associated tire (e.g., 14A). Preferably, the associated tire (e.g., 14A) is rapidly deflated.

Each tire deflator device (e.g., 26A) may have any suitable construction to rapidly deflate the associated tire (e.g., 14A). One example construction includes a pyrotechnic element, located on the associated tire (e.g., 14A), that is actuated in response to the control signal (e.g., 28A) to open an orifice sufficiently large to exhaust the compressed air within the associated tire with a short time period via use of the weight of the vehicle 12.

Preferably, the process and control portion 22 provides control signals (e.g., 28A and 28B) to the tire deflator devices (e.g., 26A and 26B) located on a side of the vehicle 12 (i.e., either the right side or the left side) toward which the vehicle is experiencing a potential roll event.

Accordingly, the system 10 causes the tire deflator devices (e.g., 26A and 26B) to deflate the tires (e.g., 14A and 14B) at the occurrence of an imminent threat of vehicle rollover such that the vehicle rollover is adverted.

Figure 2:
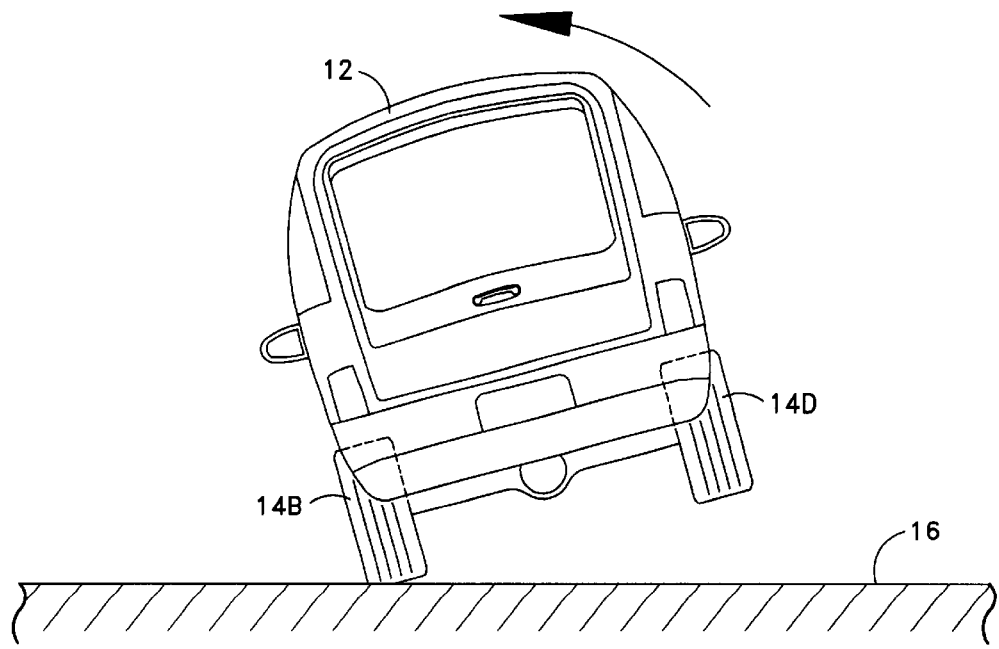
FIG. 2 is an illustration of a rear of the vehicle that contains the system of FIG. 1, and with the vehicle in a condition of imminent threat of vehicle side rollover.
Figure 3:
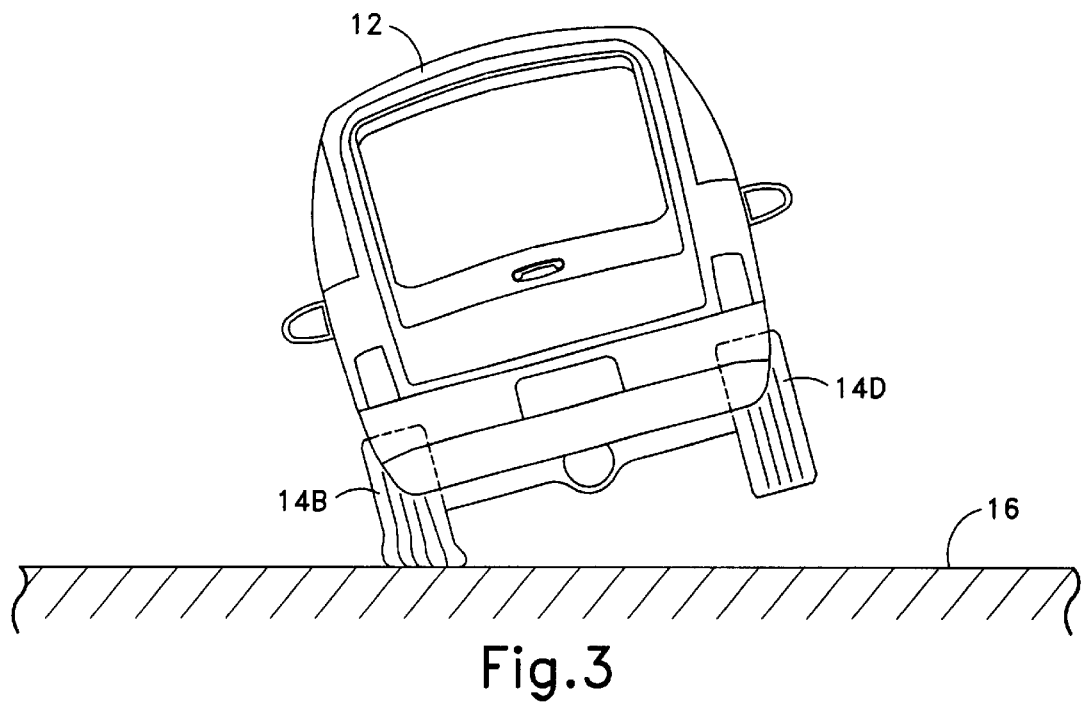
FIG. 3 is an illustration similar to FIG. 2, but with the system reacting to an affirmative determination of imminent threat of vehicle rollover.
Figure 4:
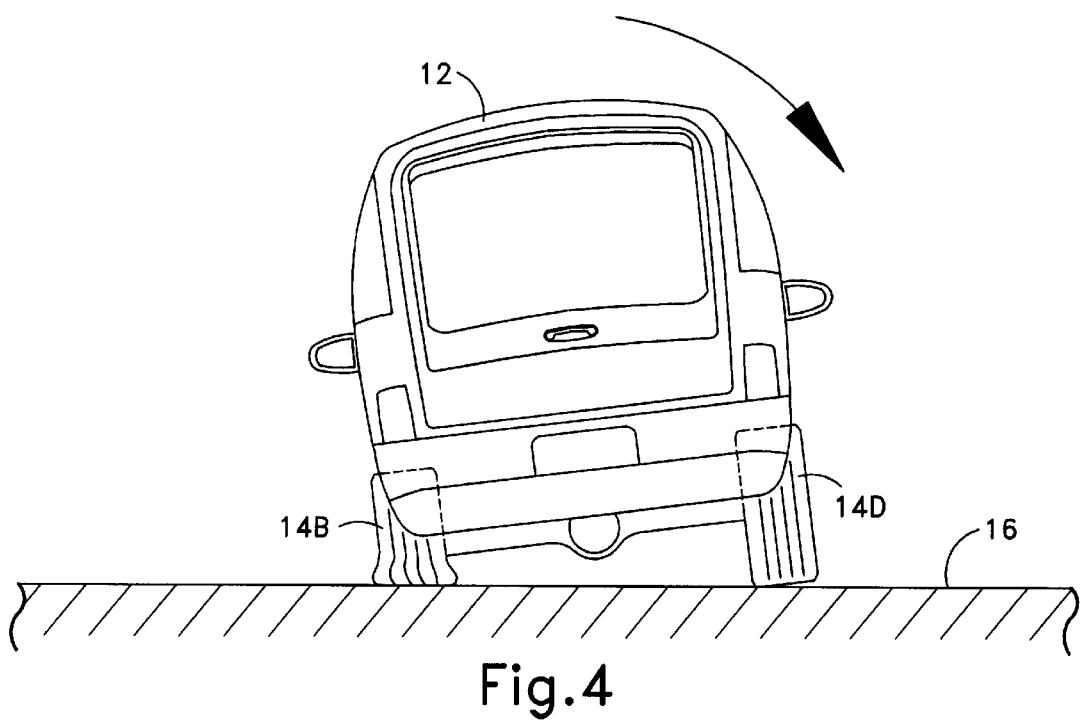
FIG. 4 is an illustration similar to FIG. 2, and shows the vehicle returning to a condition in which all four wheels engage a ground surface.

To illustrate the operation of the system 10 in accordance with the present invention, attention is directed to the sequence of FIGS. 2–4. It is to be appreciated that the depictions with FIGS. 2–4 are to foster an understanding of the present invention, and are not indented to be utilized as a representation of an actual occurrence (e.g., actions, placements, relationships, etc. may be under or over exaggerated).

In FIG. 2, the vehicle 12 is in a condition (i.e., tilted over some amount, with the roll toward the left side of the vehicle as shown by the arrow) such that an imminent threat of vehicle rollover exists. Within the system 10 (FIG. 1), the vehicle sensor(s) 18 senses the parameters) and provides the parameter signal(s) 20 to the process and control portion 22. In turn, the process and control portion 22 determines that an imminent threat of vehicle rollover exists, and in response thereto provides control signals 28A and 28B to the tire deflator devices 26A and 26B associated with the tires 14A and 14B on the left side of the vehicle 12.

In response to the control signals 28A and 28B provided by the process and control portion 22, the tire deflator devices 26A and 26B deflate the tires 14A and 14B on the left side as shown in FIG. 3. The deflation of the tires 14A and 14B on the left side of the vehicle 12 tend to counteract roll instability such that the tires 14C and 14D on the right side of the vehicle are returned (as shown by the arrow) to engagement with the ground surface 16 as shown in FIG. 4.

Figure 5:
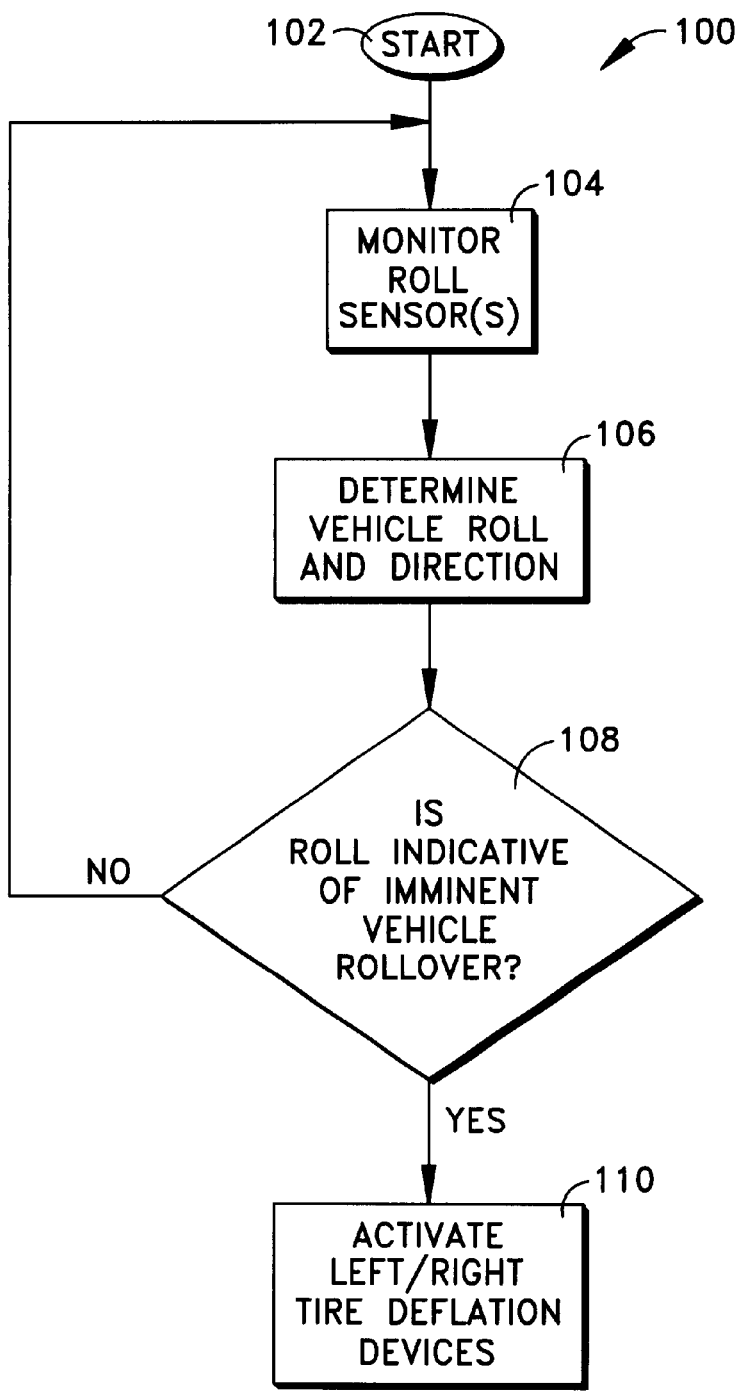
FIG. 5 is a flow chart for a process performed within the system of FIG. 1 in accordance with the present invention.

A process 100 performed within the system 10 in accordance with the present invention is shown in FIG. 5. The process 100 is associated with parameter signal input that is indicative/interpreted to provide vehicle roll information. The process 100 is initiated at step 102 and proceeds to step 104. At step 104, the process and control portion 22 monitors the parameter signal(s) 20 provided by the sensor(s) 18 (i.e., a vehicle roll sensor). At step 106, the process and control portion 22 determines vehicle roll and direction. At step 108, it is determined whether the rolling is indicative of an imminent vehicle rollover.

If the determination at step 108 is negative (i.e., an imminent threat of vehicle rollover does not exist), the process 100 loops to repeat step 104 through step 108. If the determination at step 108 is affirmative (i.e., an imminent threat of vehicle rollover is present), the process 100 proceeds to step 110. At step 110, the appropriate tire deflator devices (i.e., either the left or right tire deflator devices) are actuated.

From the above description of the invention, those skilled in the art will perceive improvements, changes and modifications. Such improvements, changes and modifications within the skill of the art are intended to be covered by the appended claims.

Having described the invention, the following is claimed:

1. A system for averting vehicle side rollover for a vehicle having inflated tires, said system comprising:

means for sensing a parameter indicative of an imminent threat of vehicle rollover to one side of the vehicle; and means for reducing an inflation pressure of one of the vehicle tires on one side of the vehicle to avert vehicle rollover in response to the imminent threat of vehicle rollover.

2. A system as set forth in claim 1, wherein said means for reducing an inflation pressure of one of the vehicle tires includes means for deflating the one of the vehicle tires.

3. A system as set forth in claim 1, wherein the vehicle has a plurality of vehicle tires on the one side of the vehicle, and said means for reducing an inflation pressure of one of the vehicle tires includes means for deflating the plurality of the vehicle tires on the one side of the vehicle.

4. A system for averting vehicle side rollover for a vehicle having inflated tires, said system comprising:

means for sensing a parameter related to potential vehicle rollover and outputting a signal indicative thereof;

means for determining if the parameter signal is indicative of an imminent threat of vehicle rollover to one side of the vehicle; and means for reducing an inflation pressure of one of the vehicle tires on the one side of the vehicle to avert vehicle rollover in response to an affirmative determination of imminent threat of vehicle rollover.

5. A system as set forth in claim 4, wherein said means for reducing an inflation pressure of one of the vehicle tires includes means for deflating the one of the vehicle tires.

6. A system as set forth in claim 4, wherein the vehicle has a plurality of vehicle tires on the one side of the vehicle, and said means for reducing an inflation pressure of one of the vehicle tires includes means for deflating the plurality of the vehicle tires on the one side of the vehicle.

7. A method for averting vehicle side rollover for a vehicle having inflated tires, said method comprising:

sensing a parameter indicative of an imminent threat of vehicle rollover to one side of the vehicle; and reducing an inflation pressure of one of the vehicle tires on one side of the vehicle to avert vehicle rollover in response to the imminent threat of vehicle rollover.

\* \* \* \* \*